June 20, 1950 — F. H. BOOR — 2,511,964

HOB

Filed Oct. 17, 1946 — 2 Sheets-Sheet 1

INVENTOR.
Francis H. Boor
BY Moore, Olson & Trexler
Attys.

June 20, 1950 F. H. BOOR 2,511,964
HOB
Filed Oct. 17, 1946 2 Sheets-Sheet 2
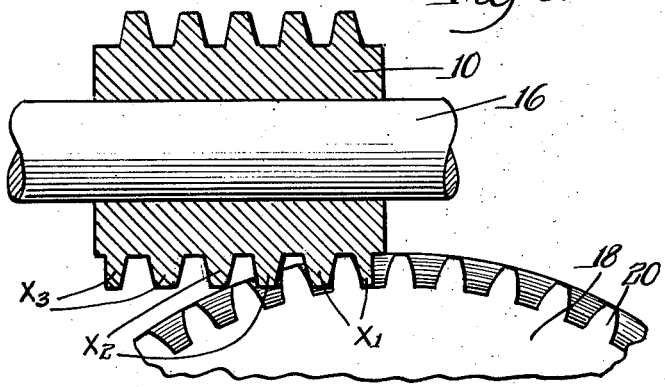
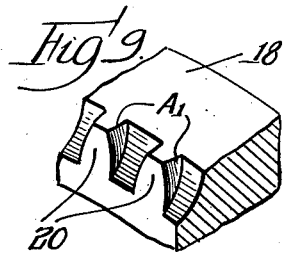
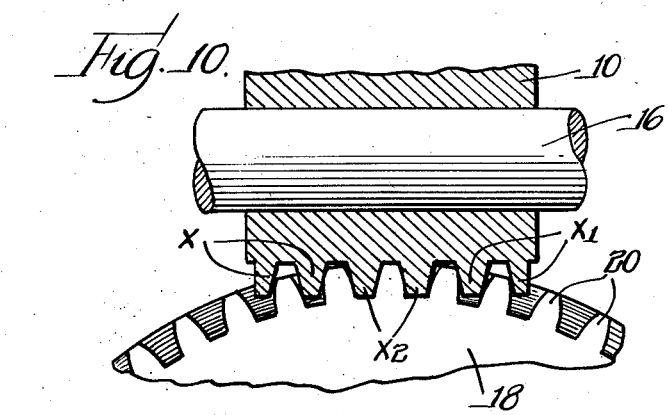
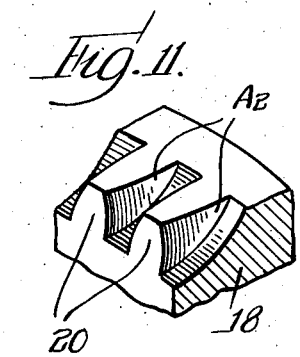
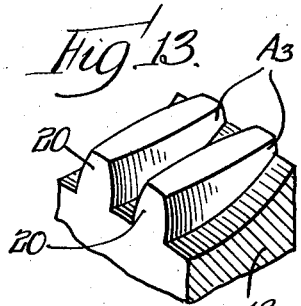
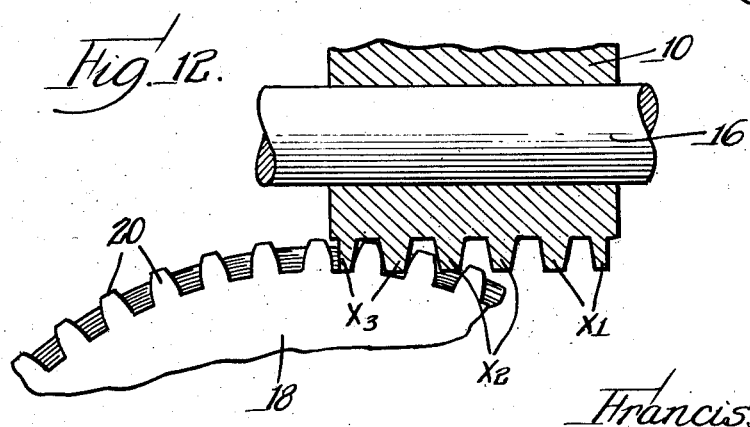
INVENTOR.
Francis H. Boor
BY
Moore, Olson & Trexler
attys.

Patented June 20, 1950

2,511,964

UNITED STATES PATENT OFFICE 2,511,964

HOB

Francis H. Boor, La Fayette, Ind.

Application October 17, 1946, Serial No. 703,895

7 Claims. (Cl. 29—103)

This invention relates generally to hobs, and more particularly to hobs for producing teeth in gear blanks, each of which vary in transverse cross-section or profile from an intermediate point toward opposite extremities of the tooth face.

It is well known to those skilled in the art, any imperfect meshing of gear teeth tends to impair the strength of the teeth under load. Hence, it has been common practice to treat the faces of the gear teeth by a lapping, burnishing or shaving process for the purpose of removing any surface irregularity resulting from the hobbing operation. This is particularly true in instances where it is desired to treat the faces of the gear teeth after the hobbing operation, so as to produce a slight convexity. By having the gear teeth slightly convex, the teeth are capable of transmitting larger loads due to the localized bearing. Gear teeth with convex face and flank curvature are frequently referred to as "crown" teeth. They have the very important functional characteristic of reducing stress concentration at the ends of the teeth where gear teeth are most vulnerable to failure. Crown teeth have a localized bearing intermediate the ends thereof because the tooth bearing does not extend to either end of the tooth. Displacement of gears under load is bound to occur because no gear housing or mounting is absolutely rigid. Localized teeth bearings as provided by crown teeth allow for such slight displacement. It is one of the important objects of the present invention to eliminate the necessity of producing the curvature in the tooth face and flank by a separate operation. To this end the invention contemplates a hob, the teeth of which are so disposed and shaped as to enable the hob to generate "crown" teeth in a gear blank.

The invention not only contemplates the generation of crown gear teeth by the use of the improved hob referred to above, but also contemplates the generation of gear teeth having concave face and flank surfaces. In other words, it is an object of the present invention to provide a hob having a novel arrangement of gear generating teeth which will produce teeth in a gear blank varying in thickness or cross-sectional profile from an intermediate point toward opposite ends of the teeth.

More specifically, the invention contemplates an improved hob of the type referred to above, wherein the profile of the hob teeth in axial cross-section vary from a point intermediate the ends of the hob body toward said ends. In one form of hob the intermediate teeth may vary from minimum axial width to maximum axial width at opposite ends, and in another form the teeth may vary from maximum axial width intermediate the ends to minimum axial width at the opposite ends of the hob.

The foregoing and other objects and advantages will be more apparent from the following detailed description, when considered in connection with the accompanying drawings, wherein—

Fig. 1 discloses a hob and a fragmentary gear blank operatively associated with the hob;

Figure 4:
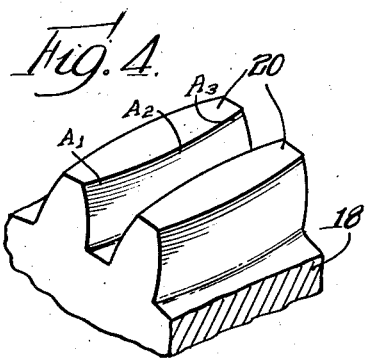
Fig. 4 is a fragmentary perspective view of convex gear teeth capable of being produced by the hob illustrated in Fig. 3, the convexity of the gear teeth being exaggerated for clarity of disclosure.
Figure 5:
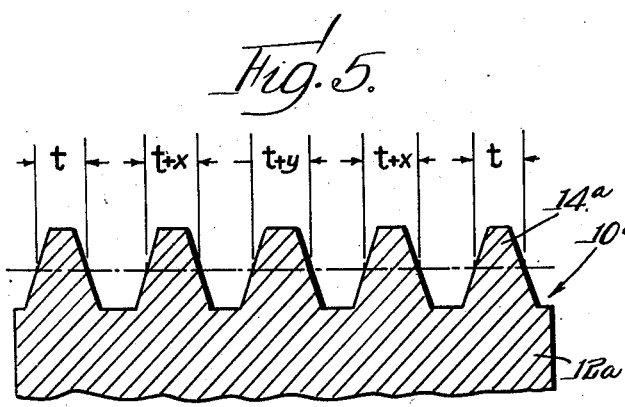
Fig. 5 is a view similar to Fig. 3, showing a modified hob tooth construction designed to produce gears with concave teeth.
Figure 6:
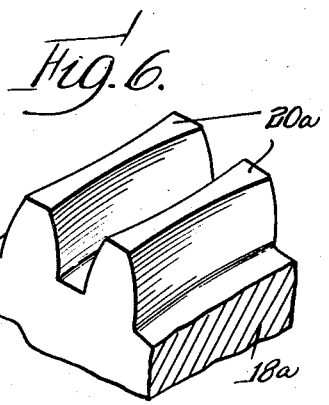
Figure 7:
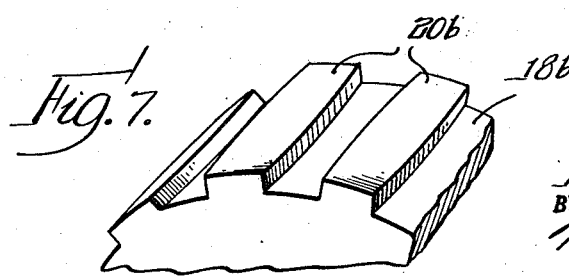

Fig. 6 discloses a fragmentary perspective view of a gear having concave teeth capable of being produced by the hob of Fig. 5, the concavity being exaggerated with a view of facilitating disclosure thereof;

Fig. 7 is a fragmentary perspective view of a spline shaft having convex splines capable of being produced by a generating cutter or hob having teeth constructed in accordance with the teachings of the present invention; and Fig. 8 shows the hob in cross section in position at the start of a cut;

Fig. 9 is a fragmentary perspective view similar to Fig. 4 showing the teeth only partially formed;

Fig. 10 is a view similar to Fig. 8 at the midway point of a hobbing operation;

Fig. 11 is a fragmentary perspective view similar to Fig. 9 showing the teeth substantially half formed;

Fig. 12 is a view similar to Figs. 8 and 10 showing the hob and gear in the relative position attained just prior to the completion of the forming of the gear; and Fig. 13 is a fragmentary perspective view similar to Figs. 9 and 11 showing the gear teeth just prior to completion of the hobbing operation.

Figure 1:
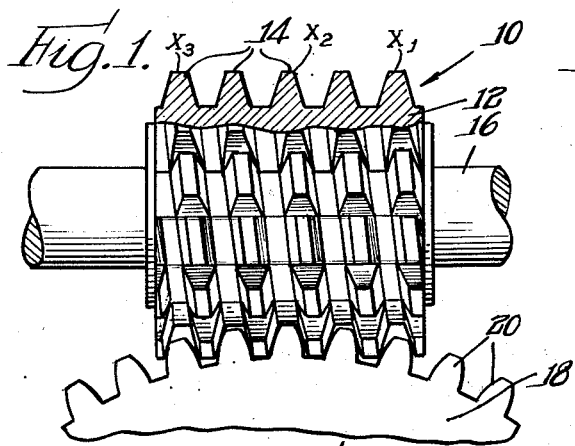
Figure 2:
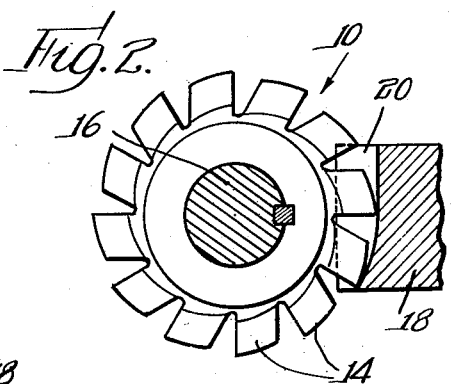
Fig. 2 is a side elevational view of the hob and gear blank shown in Fig. 1.
Figure 3:
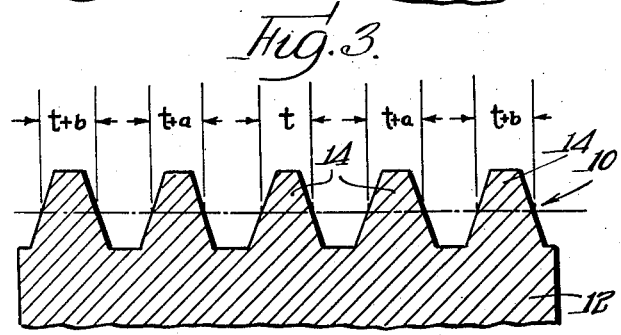
Fig. 3 is an enlarged fragmentary cross-sectional view taken axially of the hob of Fig. 1, to more clearly illustrate the variation in tooth width or profile of a hob constructed in accordance with the teachings of the present invention.

Referring now to the drawing more in detail, wherein like numerals have been employed to designate similar parts throughout the various views, it will be seen that one embodiment of the invention comprises a rotary gear tooth generating tool or hob designated generally by the numeral 10, Figs. 1, 2, and 3. This hob includes a rotary body portion 12 and a plurality of axially and circumferentially spaced peripheral teeth 14. Hobs are conventionally mounted on a rotatable drive shaft or spindle, and as shown in Figs. 1 and 2, the hob is keyed to a spindle 16. In practice, a gear blank 18 is so positioned with respect to the hob that when the parts are relatively rotated and transversely shifted with respect to each other, gear teeth will be generated along the periphery of the blank.

The present invention is particularly concerned with the provision of a gear tooth generating cutter or hob capable of producing teeth in a gear blank which vary in thickness or cross-sectional profile from an intermediate point toward opposite ends of the teeth. In Fig. 4 teeth 20 of the gear blank 18 are shown, and it will be observed that the face and flank surfaces of these teeth are convex. In other words, the teeth are somewhat "crown shaped." That is, the tooth is wider at its center $A_2$ than at its opposite ends $A_1$ and $A_3$. In order to produce the teeth 20 in the gear blank 18, the hob teeth 14 vary in cross-sectional profile over the axial extent of the hob.

In Fig. 3 one of the hob teeth positioned centrally or intermediate the opposite extremities of the hob body is designated as having a tooth width or thickness along the pitch line equal to $t$. The hob tooth to the left and the hob tooth to the right of this central tooth are designated as having a width along the pitch line equal to $t$ plus $a$. The next adjacent hob teeth positioned at each end of the hob body are designated as having a width equivalent to $t$ plus $b$ where $b$ is an increment greater than the increment $a$. Thus the width of the hob teeth increase from the central or intermediate portion of the body toward the opposite ends thereof, the degree of variation depending upon the degree of crown effect which is desired in the completed gear. Stating it another way, the axially and circumferentially spaced peripheral teeth 14 of the hob vary in axial width from an intermediate point $X_2$ on the body toward the opposite ends $X_1$ and $X_3$ of said body in such a manner as to produce teeth 20 in the gear blank 18, each of which correspondingly vary in thickness from an intermediate point of the cutter blank toward opposite ends of the tooth face.

In order to generate the teeth 20, it is necessary to apply tangential feed to the hob and gear blank. This may be accomplished by submitting the rotating hob to axial movement or by subjecting the rotating gear blank to transverse movement. A relative motion parallel to the axis of the gear blank is also necessary to cut the teeth from one side of the blank to the other. The resulting relative motion between the hob and gear blank is, of course, oblique. The shaft on which the hob is mounted is skewed from the plane of the gear blank at an angle equal to that of the lead of the helix of the hob when in use. For simplicity of illustration this skewed position is not featured in the drawing. The teeth $X_1$ at one end of the hob make the initial cut into the gear blank at $A_1$, and as the tangential feed, as well as the feed axially of the gear blank continues, the intermediate teeth $X_2$ of the hob perform their cutting operation at the central or intermediate portion $A_2$ of the blank. As the relative oblique movement continues, the final cutting operation at $A_3$ is performed by the teeth $X_3$ at the opposite end of the hob. From this it will be understood that the hob teeth of greater width produce a gear tooth of smaller width, and as the hob teeth of smaller width are brought into action, the cross-sectional profile of the gear teeth correspondingly increases in size. In the described embodiment the teeth 14 of the hob 10 are formed so as to produce the high point of the crown in the gear teeth at the center of the gear blank. This could be varied so as to shift the high point of the crown toward either side of the gear blank.

The gear operation perhaps may be better understood with reference to Figs. 8–13 wherein the hobber and the gear being formed are shown substantially at the start of a hobbing operation, at an intermediate point in the hobbing operation and substantially at the end of the operation.

In Fig. 8 the hob 10 is shown in cross section in position at the start of a cut. The gear blank 18 has at this time already turned through more than one revolution. The thicker teeth $X_1$ are doing the cutting while the teeth $X_2$ and $X_3$ are riding clear of the gear blank 18 and a certain amount of metal has been removed from the blank so that the teeth 20 are partially formed as shown at $A_1$ in Fig. 9. As is common in hobbing operations, the hob is moved axially relative to the blank and the blank is moved along its own axis relative to the hob.

The relative movement of the blank and hob due to the respective axial movements is oblique and the hob and blank are shown in Fig. 10 at approximately the midway point of the hobbing operation. The thinner hob teeth $X_2$ at the center of the hob are now doing the cutting and the gear teeth 20 are now being formed at the thickest point $A_2$ (see Fig. 11). The thicker hob teeth $X_1$ and $X_3$ are removing some metal from the blank at the rear edge of the bite but they do not extend far enough into the blank to be forming the side walls of the gear teeth. It is apparent that in the position shown in Fig. 8 the hob teeth $X_2$ are similarly removed from the blank a sufficient distance so that they do not at that time determine the faces of the gear teeth although they may remove some metal at the rear edge of the bite.

Just prior to the completion of the forming of the gear the hob 10 and gear blank 18 reach the relative position shown in Fig. 12. The hob has now moved axially to the right so that the thicker teeth $X_3$ are doing the cutting and determine the faces of the gear teeth as shown at $A_3$ in Fig. 13. The hob teeth $X_1$ are completely clear of the gear blank and are doing no cutting whatsoever while the hob teeth $X_2$ are at least partially clear of the gear blank, and are doing little if any cutting, certainly not enough to determine the faces $A_3$ of the gear teeth. As has been noted heretofore in this application, the shaft 16 on which the hob 10 is mounted is not parallel to the plane of the gear blank, but is skewed from this plane at an angle equal to the angle of the lead of the helix on the hob. This is a common arrangement as is the relative oblique movement between the hob and gear blank in addition to the rotation of each, and will be readily understood by those skilled in the art.

In Fig. 6, gear teeth of concave form are shown which are capable of being produced by the teeth 14a of a hob 10a of Fig. 5. The gear blank in Fig. 6 is designated by 18a, and the concave gear teeth by the numeral 20a. It will be noted that the teeth in the hob 10a are narrower at the opposite ends of the hob body 12a than the intermediate teeth. For purposes of illustration, the width along the pitch line of the end teeth 14a of the hob 10a is designated by $t$, the width along the pitch line of the next adjacent teeth is designated by $t$ plus $x$, and the central or intermediate tooth is designated as having a width along the pitch line equivalent to $t$ plus $y$. From this explanation it will be understood that the hob teeth 14a increase in axial cross-section or width as they approach the center of the hob, bearing in mind that the increment $y$ is larger than the increment $x$. The hob 10a is capable of producing the teeth 20a illustrated in Fig. 6.

In Fig. 7 a spline shaft designated generally by the numeral 18b is shown having crown shaped splines 20b. These crown shaped splines may be produced by a hob somewhat similar to the hobs shown in Figs. 1 to 3, inclusive, in that the teeth of such a hob would have a maximum width or cross-sectional area at the opposite extremities of the hob body and a minimum width at the intermediate or central portion of the body. From the foregoing, it should be clear that the present invention contemplates a hob for generating gear teeth, wherein the teeth of the hob vary in axial width or cross-sectional profile from an intermediate point on the body toward opposite ends of the body. The hob of Figs. 1 to 3, inclusive, is provided with teeth which increase in width from the central or intermediate portion towards the opposite ends of the hob body. This produces a crown effect in the gear teeth. In the hob of Fig. 5 the teeth decrease in width from the central or intermediate portion towards the opposite ends of the hob body. Hob teeth having this configuration produce gear teeth having concave face and flank portions, as illustrated by the gear teeth 20a of Fig. 6. In Figs. 4, 6, and 7, the curvature in the tooth faces has been somewhat exaggerated to facilitate the disclosure thereof. Obviously, in practice, the degree of curvature may be extremely small, and, in fact, incapable of normal visual detection.

While hob teeth having specific profile forms have been disclosed herein, it will be understood that the invention is capable of many other modifications and changes in tooth forms without departing from the spirit and scope of the appended claims.

The invention is hereby claimed as follows:

1. A hob for generating teeth in a rotatable gear blank including a cylindrical body portion, and a plurality of axially and circumferentially spaced peripheral teeth for generating teeth in a rotatable blank, said hob teeth varying in axial width from an intermediate point on said body toward opposite ends of said body whereby to produce teeth in a blank, each of which correspondingly vary in thickness from an intermediate point toward opposite ends of the tooth face.

2. A hob for generating teeth in a rotatable gear blank including a cylindrical body portion, and a plurality of axially and circumferentially spaced peripheral teeth for generating teeth in a rotatable blank, said hob teeth varying in axial width from a central point on said body toward opposite ends of said body whereby to produce teeth in a blank, each of which correspondingly vary in thickness from a central point toward opposite ends of the tooth face.

3. A hob for generating teeth in a rotatable gear blank including a cylindrical body portion, and a plurality of axially and circumferentially spaced peripheral teeth for generating teeth in a rotatable blank, the profile of said hob teeth in axial cross-section varying from an intermediate point on said body toward opposite ends of said body whereby to produce teeth in a blank, each of which correspondingly vary in transverse cross-section from an intermediate point toward opposite ends of the tooth face.

4. A hob for generating teeth in a rotatable gear blank including a cylindrical body portion, and a plurality of axially and circumferentially spaced peripheral teeth for generating teeth in a rotatable blank, said hob teeth varying in axial width from an intermediate point on said body of minimum width toward opposite ends of said body whereby to produce teeth in a blank, each of which correspondingly vary in thickness from an intermediate point of maximum thickness toward opposite ends of the tooth face.

5. A hob for generating teeth in a rotatable gear blank including a cylindrical body portion, and a plurality of axially and circumferentially spaced peripheral teeth for generating teeth in a rotatable blank, said hob teeth varying in axial width from an intermediate point on said body of maximum width toward opposite ends of said body whereby to produce teeth in a blank, each of which correspondingly vary in thickness from an intermediate point of minimum thickness toward opposite ends of the tooth face.

6. A hob for generating teeth in a rotatable gear blank including a cylindrical body portion, and a plurality of axially and circumferentially spaced peripheral teeth for generating teeth in a rotatable blank, said hob teeth varying in axial width from an intermediate point of minimum thickness toward points of maximum thickness at opposite ends of said body whereby to produce teeth in a gear blank, each of which presents oppositely disposed convex tooth faces.

7. A hob for generating teeth in a rotatable gear blank including a cylindrical body portion, and a plurality of axially and circumferentially spaced peripheral teeth for generating teeth in a rotatable blank, said hob teeth varying in axial width from an intermediate point of maximum thickness toward points of minimum thickness at opposite ends of said body whereby to produce teeth in a gear blank, each of which presents oppositely disposed concave tooth faces.

FRANCIS H. BOOR.

REFERENCES CITED

The following references are of record in the file of this patent:

UNITED STATES PATENTS

| Number | Name | Date |
|---|---|---|
| 1,269,123 | Simmons | June 11, 1918 |
| 1,436,159 | Fitzpatrick | Nov. 21, 1922 |
| 2,304,586 | Miller | Dec. 8, 1942 |